Aug. 7, 1945.  W. P. CANNING  2,381,573
LENS CHUCK
Filed Jan. 29, 1942  2 Sheets-Sheet 1

WILLIAM P. CANNING
INVENTOR

BY Louis L. Gagne
ATTORNEY

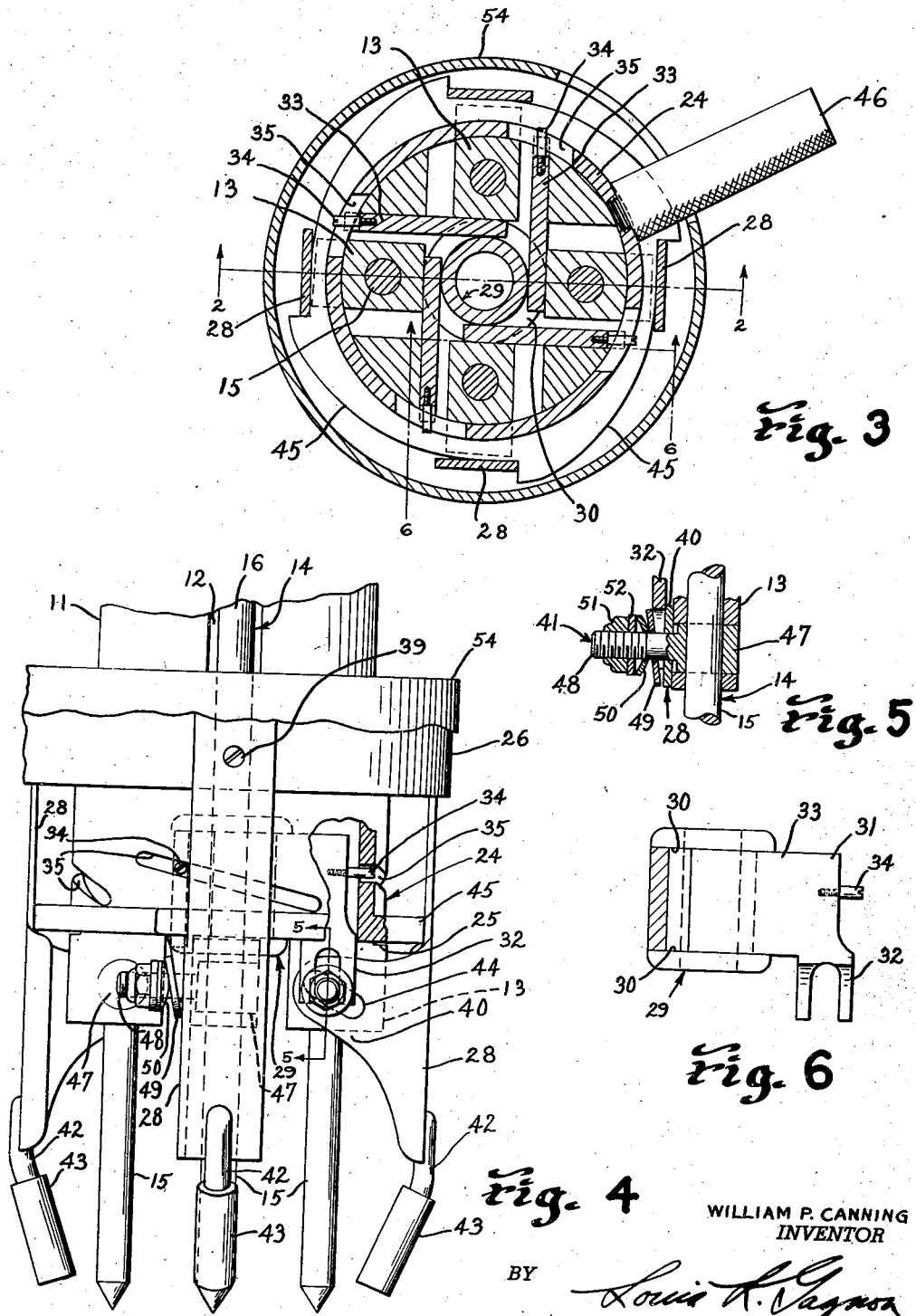

Patented Aug. 7, 1945

2,381,573

UNITED STATES PATENT OFFICE 2,381,573

LENS CHUCK

William P. Canning, Southbridge, Mass., assignor to American Optical Company, Southbridge, Mass., a voluntary association of Massachusetts Application January 29, 1942, Serial No. 428,713

9 Claims. (Cl. 51—277)

This invention pertains primarily to lens blocking devices and more particularly to a chuck or lens holder for holding a lens blank in a given position, determined by the optical characteristics which the finished lens is to possess, during the blocking of said blank to a lens holder.

Heretofore, lens chucks of the class set forth herein had the individual lens gripping fingers and positioning pins individually operated so that several manual manipulations were required to lock the lens in position in the lens chuck. The present invention contemplates means for simultaneously locking the fingers and pins individually by a single manipulation of one lever.

It is therefore an object of the present invention to provide a lens chuck whereby the several positioning pins and lens gripping fingers are simultaneously locked by a simple manipulation of a lever.

A further object of the invention is to provide a lens chuck which is constructed so as to facilitate and expedite the chuck operation.

A further object of the invention is to provide a lens chuck which will prevent false operation because it eliminates the human element of failure to lock all of the independent members.

Another object is to assure locking of all of the positioning pins and lens holding fingers simultaneously and in substantially equal degree when the lens chuck is properly adjusted.

Other and further objects may be and may become apparent from a perusal of the specification and claims, and it is to be understood that the invention is not limited to the specific disclosure herein since the present showing is by way of illustration only and is not to be considered as a limitation as equivalent parts may be utilized without departing from the spirit of the invention as set forth in the subjoined claims.

In the drawings:

Fig. 3 is a sectional view of the lens chuck taken substantially along lines 3—3 of Fig. 2.

Fig. 4 is an enlarged side view partially broken away with certain parts shown in section.

Fig. 5 is an enlarged view taken along lines 5—5 of Fig. 4, partially broken away and partially shown in section more clearly indicating the specific relation of the finger and positioning pin locking mechanism.

Fig. 6 is an enlarged side view of one locking wedge in relation to the spool.

Figure 1:
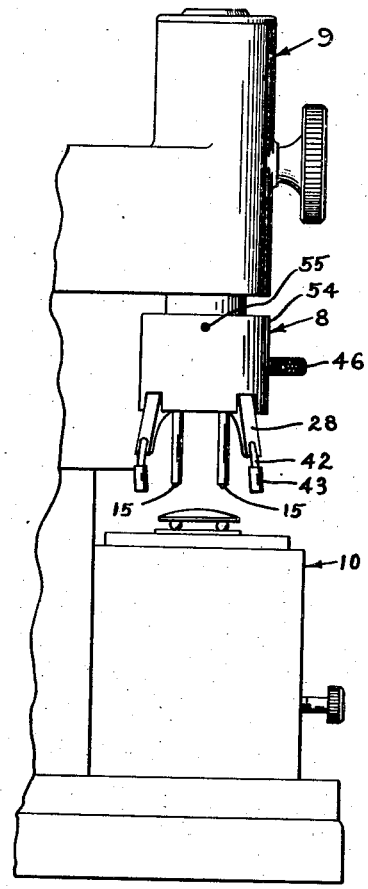
Fig. 1 is a partial side view of the lens chuck shown in position on a lens blocking machine.

Referring to the drawings and more particularly to Fig. 1, a portion of a lens blocking machine of the general type as set forth in the patent to Lloyd W. Goddu, Patent Number 2,253,954, issued August 26, 1941, is shown having a chuck 8 held in a holder 9 above a base portion 10. The present invention utilizes the chuck 8 for a blocking machine or the like wherein the lens chuck of the general class referred to in the Goddu application may be employed.

Figure 2:
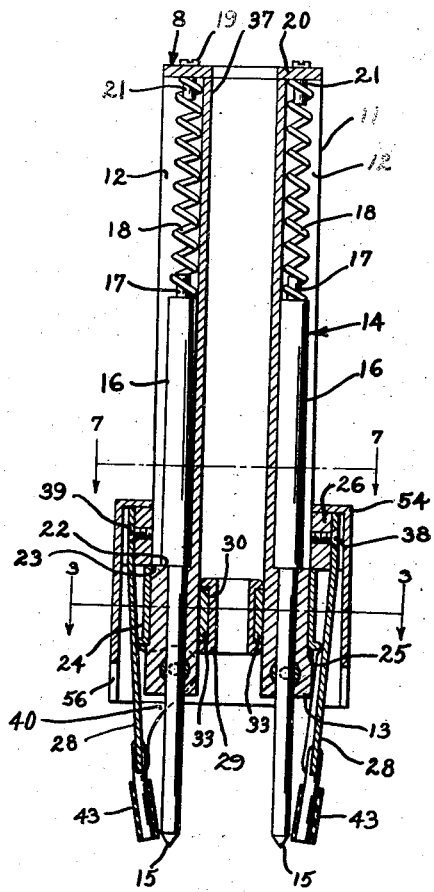
Fig. 2 is a view taken substantially along lines 2—2 of Fig. 3 of the entire lens chuck with the positioning pins and springs shown in full lines.
Figure 7:
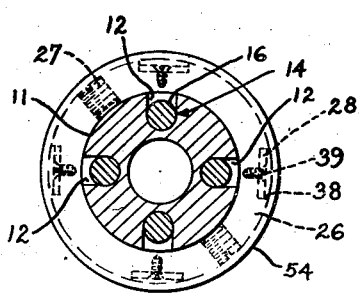
Fig. 7 is a sectional view taken along lines 7—7 of Fig. 2 showing the positioning pins in relation to the main body of the chuck.

In Figs. 2 and 7, the lens chuck 8 has a main body portion 11 which has four positioning pin slots 12 on one end thereof with four positioning pin guides 13 on the other end thereof. A cross sectional view in Fig. 3 shows that the positioning pin guides 13 are spaced equidistant on the chuck. The positioning pin guides 13 are aligned with the positioning pin slots 12. The positioning pins 14 are unitary members having a lens contacting portion 15 on the bottom portion thereof with a spring engaging portion 16 on the other end thereof. A vertical hole centrally located in each of the positioning pin guides 13 receives the lens contacting portion 15 while the spring engaging portion 16 has a spring stud 17 on the upper end thereof. Without the spring, it will be seen that the positioning pin 14 which comprises the two portions 16 and 15 is free to move up and down in the positioning pin slot 12 and the positioning pin guides 13. A cap 20 is secured to the upper end of the main chuck body 11 by screws 19 which are threadedly connected into the solid portion between the equidistant spaced positioning pin slots 12. Spring studs 21 are secured to the cap 20 by any convenient means, with said spring studs being disposed in the positioning pin slot.

The spring 18, which is an expanding spring, has its opposing ends engaging the spring studs 17 and 21 respectively so that under the expanding action of the spring 18, the positioning pin shoulder 22 is urged against the positioning pin guide shoulder 23 so that normally the positioning pins are fully distended so that the positioning pin shoulder 22 will normally engage the positioning pin guide shoulder 23. In Fig. 7, it will be more clearly seen from the cross section taken along lines 7—7 of Fig. 2 that the positioning pin 14 has its spring engaging portion 16 in the positioning pin slot 12.

A camming collar 24 is slid over the end of the main body portion until it engages the positioning pin guide shoulders 25. The body collar 26 is slid over the main body portion until the lower end of the body collar 26 engages the camming collar 24, with said body collar 26 being secured to the main body 11 by means of headless set screws 27 (Fig. 7) which hold the body collar in position on the main body of the chuck.

The camming collar 24 is held between the positioning pin guide shoulder 25 and the lower edge of the body collar 26, but the camming collar 24 is free to rotate so that it may rotate its camming surfaces to lock its positioning pins 14 and the lens holding fingers 28.

From the foregoing, it will be seen that the unitary positioning pins are now slidably located with one portion of each pin in the positioning pin guides 13 and the opposite end of each pin in the positioning pin slots 12, while the camming collar is rotatably held between the positioning pin guide shoulders 25 and the body collar 26.

Referring to Figs. 3 and 6, a spool 29 has shoulders 30 on either end thereof. A wedge 31 has a wedge portion 32 and a wedge spool guide 33. The wedge spool guide fits between the shoulders 30 of the spool 29. The wedge portion 32, as will be explained later, locks the positioning pin and the lens holding finger. The lens holding fingers will be referred to hereinafter as "fingers" 28. A wedge cam pin 34 is secured in one end of the wedge 31 so that it will engage the inclined wedge cam 35.

In assembling, the wedges 31 may have the wedge spool guides 33 located in the spool 29 between the spool shoulders 30. The four wedges with the spool may be located in position as shown in Fig. 2 with the spool 30 going into the center opening 37 of the main chuck body 11 between the positioning pin guides 13. In Figs. 2 and 3, the wedge spool guides 33 may be seen located within the shoulders of the spool and extending outwardly so that the wedge cam pin 34 will engage the inclined wedge cam 35. It will therefore be seen that all four of the wedge cam pins 34 each engage its respective wedge cam 35, so that a rotation of the camming collar will cause the wedge cam pins 34 to simultaneously raise or lower the wedges 31 and the spool 29. The spool is freely slidable within the opening 37 of the main chuck body, and the function of the spool is to assist in keeping the wedges all in alignment so that the locking of the positioning pins and their respective lens holding fingers will be simultaneous and equal in pressure.

The lens holding fingers 28 are made of spring metal urging inwardly and are located in finger slots 38 and are secured thereto by screws 39. The free ends of the lens holding fingers 28, more clearly shown in Fig. 4, extend downwardly and have an arm portion 40 which has a slot 44 therein, which slot fits over the locking stud 41. On the end of each of the fingers 28 is a protuberance 42 which has a rubber covering 43.

The camming collar 24 has a series of finger cams 45 which are clearly shown in Figs. 3 and 4. The fingers 28 which are of resilient material, are normally urged inwardly against the finger cams 45 so that when the cam collar 24 is in the position shown in Fig. 3, the fingers are in their innermost position toward the center of the chuck. By rotating the finger cams 45, by the handle 46, in a counter-clockwise movement in Fig. 3, the fingers 28 will be moved outwardly from the center of the chuck. A handle 46 is threadedly connected to the camming collar 24 to rotate same. It will therefore be seen that when the handle 46 is rotated, the wedges 31 will have their wedge cam pins 34 engage the wedge cam 35 so that the wedges may be moved up and down. Simultaneously, the rotation of the camming collar 24 will permit the fingers 28 to be moved in and out as the wedges move down and up. The movement of the wedges 31 in a downward manner as shown in Figs. 4 and 5 will act to lock the positioning pins 14 simultaneously with the locking of the fingers 28.

The locking of the positioning pins and fingers will be more clearly understood from the enlarged view shown in Fig. 5. In Fig. 5, the lens contacting portion 15 of the positioning pin 14 is shown extending through the positioning pin guide 13. The stud 41 has a head 47 with an aperture therein of about the same size as the aperture for receiving the positioning pin in the positioning pin guide 13. The head 47 of the stud 41 is round as shown in Fig. 4 and it will be observed that the thickness of the head, Fig. 5, does not extend as far to the left as the guide fingers 28. The wedge 32 is located to the left of the finger 28, so that the arm portion 40 of the finger 28 is disposed between the wedge positioning pin guide 13 and the wedge 32. A flat washer 49 is located to the left of the wedge while a spring washer 50 is located to the left of the flat washer. A nut and washer 51 and 52 respectively are located to the left of the flat washer.

It will be seen that when the nut 51 is properly adjusted on the screw portion 48 so that the spring washer 50 places the proper tension on the locking combination of parts, the various components as shown in Fig. 5 will be securely held in position.

In operation, a counter-clockwise movement of the handle 46 in Fig. 3, will cause the camming collar 24 to be rotated so that the wedge action of the wedge portion 32 will act against the spring washer 50 so that the wedge portion 32 will tend to move the stud 41 to the left thereby drawing the right hand portion of the stud head to the left and against the positioning pin so that the positioning pin is securely gripped in the particular location in which it is disposed at the time of the locking, while simultaneously the wedge will force the finger 28 against the positioning pin guide 13 so that the finger will also be locked simultaneously with the locking of the positioning pins.

A cover 54 fits over the upper portion of the finger assembly and the wedge assembly, which cover is secured to the body collar 26 by means of screws 55. Slots 56 are cut in the cover 54 at the lower end thereof opposite the fingers, so that the normal spring action of the fingers may urge the fingers outwardly through the slots 56 in the lower portion of the cover to permit a wider range of spreading between the fingers while providing maximum covering by the cover 54.

From the foregoing, it will be seen that the lens chuck may be employed in a lens holding device of the class set forth in the aforementioned Goddu patent. A semi-finished lens blank will be positioned below the lens chuck so that the positional factors of the finished prescriptive power which the lens is to possess may be determined in positioning the semi-finished lens before it is gripped by the lens chuck. The semi-finished lens, before being gripped by the chuck, is positioned so that the prism and cylinder axis and the extent of same is a determining factor in the position of the lens before it is gripped by the lens chuck.

After the lens is properly positioned in the lens holding device in which the chuck is used, the lens chuck is lowered over the unfinished surface of the lens under treatment. The lens chuck is lowered sufficiently so that all four of the pins may engage the lens whereby the pins are moved depending upon the upper curvature of the lens at the point of contact by the lens contacting portion of the positioning pins with the lens. The movement of the handle 46 on the lens chuck will permit the fingers to be released so that they have a four point contact engagement with the peripheral edge of the lens. A continued movement of the handle 46 will cause a simultaneous locking of the positioning pins and the fingers.

After the positioning pins and fingers are locked by the wedging action of the chuck, the chuck and its holder is swung around so that it is located over a lens block which is covered with pitch. The lens chuck is then lowered over the lens block so that the lens will be secured to the lens block by pitch or other adhesive, the position of the lens on the lens block being determined by the position of the lens when it was gripped by the chuck. The chuck holds the lens in the particular position on the pitch of the lens block until the pitch becomes sufficiently hard to permit the lens to be adhered to the lens block so that the chuck may be removed. After the removal of the chuck, the lens is held to the block and thereafter ground and polished as required.

From the foregoing, it should be clear that the positioning pins and lens gripping fingers will be simultaneously operated by a single manipulation of a lever, thereby eliminating the element of human error by failure to lock any of the positioning pins which was necessary in the art heretofore.

Having described my invention, I claim:

1. A lens holding device of the class described comprising a main support, a plurality of pin members slidably mounted in said main support, means for urging said pin members in a given direction, a plurality of resiliently mounted dependent members, a camming collar rotatably mounted on said main support, locking means for said pin members and said dependent members, and camming means on said camming collar for simultaneously locking said pin members and said dependent members in a predetermined position.

2. A holding device of the class described for holding a lens in a predetermined position comprising a main body having a plurality of pin guide members, a pin slidably mounted in each of said guide members, a locking mechanism for each of said pins, a plurality of resilient members for gripping a lens and unitary operable means for simultaneously locking all of the pins and the plurality of resilient lens gripping members in a predetermined position.

3. A chuck of the class described for holding articles of the character of lenses comprising a main support, a plurality of slidable pins resiliently mounted on said main support, a plurality of fingers resiliently mounted on said main support and unitary operable means for simultaneously locking all of said slidable pins and all of said resilient fingers in a predetermined position.

4. A lens chuck of the class described for holding articles of the character of lenses comprising a main support, a plurality of pin members slidably mounted in said main support, resilient means for urging said pin members in a given direction, a plurality of dependent fingers mounted on said main support and resiliently urging the free ends thereof toward the longitudinal axis of the main support, locking means for said pin members and said dependent members, and means for simultaneously operating said locking means for locking said pin members and said dependent members in a predetermined position.

5. A lens holding device of the class described for holding a lens in a predetermined position comprising a main support, pin members slidably and resiliently mounted in said main support, resilient means secured to the main support for engaging the peripheral edge of a lens, a locking mechanism including a wedging member for locking each of the pin members and the resilient means in a predetermined position, and means for operating the wedging members to simultaneously lock the pin members and the resilient means by a single lever action.

6. A lens holding device of the class described for holding a lens in a predetermined position comprising a main support, pin members slidably and resiliently mounted in said main support, resilient members secured to the main support for engaging the peripheral edge of a lens, a locking mechanism including a wedging member for locking each of the pin members and the resilient members in a predetermined position, and camming means for simultaneously operating the individual wedging members to simultaneously lock the pin members and the resilient members.

7. A lens holding device of the class described for holding a lens in a predetermined position comprising a main support including pin guide means, pin members slidably mounted in said guide means, resilient members mounted on said main support, a camming collar mounted on said support intermediate said pin members and said resilient members, locking means for locking said pin members and said resilient members, and cam means on said camming collar for simultaneously locking or releasing the pin members and resilient members.

8. A lens holding device of the class described for holding a lens in a predetermined position comprising a main support including pin guide means, pin members slidably mounted in said guide means, resilient members mounted on said main support, a camming collar mounted on said support intermediate said pin members and said resilient members, locking means for locking said pin members and said resilient members, cam means on said camming collar for simultaneously locking or releasing the pin members and resilient members, and a cover for a portion of said resilient members and said locking means, said cover having slots therein to permit the movement of the resilient members in the slots.

9. A device of the character described comprising a support having a plurality of contact members adjustably carried thereby for engaging the side surface of a lens and having a plurality of holding fingers adjustably carried thereby for engaging the edge surface of said lens and locking mechanism carried by said support and having adjustable binding portions associated with each of said respective contact members and each of said respective holding fingers and a unitary operable member having portions associated with said respective binding portions for simultaneously operating all of said binding portions to in turn lock all of said contact members and fingers in adjusted position by a single manipulation of said unitary operable member.

WILLIAM P. CANNING.